United States Patent [19]

Collman et al.

[11] 3,872,168

[45] Mar. 18, 1975

[54] SYNTHESIS OF ACIDS AND AMIDES

[75] Inventors: James P. Collman, Stanford; Stanley R. Winter, Palo Alto; Robert G. Komoto, East Palo Alto, all of Calif.

[73] Assignee: The Board of Trustees of the Leland Stamford Junior University, Stamford, Calif.

[22] Filed: Oct. 2, 1972

[21] Appl. No.: 293,859

[52] U.S. Cl.............. 260/539 R, 260/404, 260/413, 260/485 R, 260/514 R, 260/515 R, 260/535 R, 260/540, 260/557 R, 260/558 R, 260/561 B, 260/561 N, 260/561 R

[51] Int. Cl............................................. C08h 17/36

[58] Field of Search............ 260/539 R, 539 A, 413, 260/514 R, 515 R, 535 R, 540

[56] References Cited

UNITED STATES PATENTS 3,116,306  12/1963  Heck................................ 260/410.9

FOREIGN PATENTS OR APPLICATIONS 588,919  12/1959  Canada............................... 260/539

OTHER PUBLICATIONS

Takegami et al., Bull'n Chem. Soc. of Japan, 40, 1456–1458 (1967).

Masada et al., Bull'n Chem. Soc. of Japan, 43, 3824–3829 (1970).

*Primary Examiner*—Lewis Gotts
*Assistant Examiner*—Ethel G. Love
*Attorney, Agent, or Firm*—Edward B. Gregg

[57] ABSTRACT

Synthesis of acids $R_1COOH$ and amides $R_1CONR_2R_3$ wherein $R_1$ is attached to the carbonyl group by an aliphatic carbon atom and $R_2$ and $R_3$ are hydrogen or organic groups of a primary or secondary amine, by forming an alkyl or acyl intermediate $[R_1Fe(CO)^-_4$ or $R_1COFe(CO)^-_4]$ and treating the intermediate with a suitable cleaving agent and, in the case of amides, also with ammonia or an amine.

13 Claims, No Drawings

SYNTHESIS OF ACIDS AND AMIDES

The invention herein described was made in the course of work under a grant or award from the National Science Foundation.

This invention relates to the synthesis of aliphatic carboxylic acids and their amides.

In a copending application, Collman and Winter, Ser. No. 232,247, filed Mar. 6, 1972, entitled "Synthesis of Ketones," and in a paper by Collman et al J. Am. Chem. Soc. 94 1788 (1972) a method of synthesizing ketones is described wherein the tetracarbonylferrate dianion, $Fe(CO)_4^{--}$, is reacted with an alkylating agent $R_1X$ to produce an intermediate which is then reacted with another alkylating agent $R_2X$ to afford a ketone $R_1COR_2$, $R_1$ and $R_2$ being the alkyl or other desired organic groups and X being a leaving group. Among the advantages of this synthesis are its ability to tolerate functional groups and to afford ketones having functional groups, also its ability to afford ketones having optical activity resulting from the chirality of the carbon atom of $R_1$ and/or $R_2$ which is attached to the leaving group X. That is to say, by this method ketones $R_1COR_2$ are provided in which one or both of the groups $R_1$ and and $R_2$ have a functional substituent and/or have a chiral carbon atom attached to the keto group and which is in an optically active form rather than a racemic mixture.

It is an object of the present invention to adapt this method of synthesis to the synthesis of acids $R_1COOH$ and amides $R_1CONR_2R_3$ wherein $R_1$ is a group attached by an aliphatic carbon atom to the carbonyl group and $R_2$ and $R_3$ are hydrogen or organic groups of primary and secondary amines.

The synthesis of a few ethyl esters $R_1COOC_2H_5$ by using potassium tetracarbonylferrate has been described in publications by certain Japanese workers [Takegami et al, Bulletin of the Chemical Society of Japan, 40 1456-1458 (1967) and Masada et al, Bulletin of the Chemical Society of Japan, 43 3824-3829 (1970)]. The method of these workers employed a mixture of potassium tetracarbonylferrate and other iron carbonyl complexes prepared by the reaction of iron pentacarbonylferrate and potassium hydroxide in alcohol. This mixture contributed to low yields. Moreover, the method employed is restricted to the synthesis of relatively few esters such as the ethyl esters and it does not provide a direct route to acids and amides.

It is a further object of the invention to employ the tetracarbonylferrate dianion route to the direct synthesis of acids and amides.

It is another object of the invention to provide methods of synthesis of acids and amides using the tetracarbonylferrate dianion (hereinafter sometimes referred to as the "dianion") which allows the use of a wide variety of solvents, of substrates $R_1X$, and of amines (where amides are the desired end product) with good yields and at fast reaction rates.

We have found that acids $R_1COOH$ and esters $R_1CONR_2R_3$ ($R_1$, $R_2$ and $R_3$ being as defined above) can be obtained generally in good yields using the tetracarbonylferrate dianion, by the following reactions:

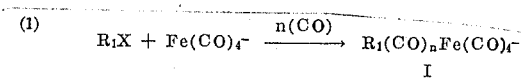

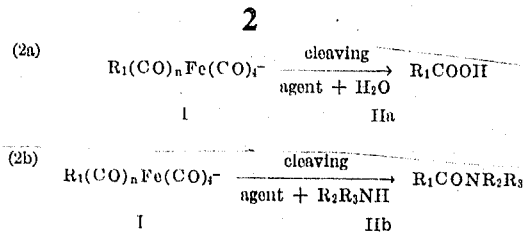

In the above, n is zero or unity. Reaction (1), which leads to the intermediate I, may be carried out in two ways, (1a)    $R_1X + Fe(CO)_4^= + CO \rightarrow R_1CO\,Fe(CO)_4^-$      (1a)

(1b)    $R_1X + Fe(CO)_4^= \rightarrow R_1Fe(CO)_4^-$      (1b)

Route 1a, which employs CO as a reactant, forms the acyl intermediate Ia. Route (1b), which does not employ CO as a reactant, forms the alkyl intermediate Ib. The relative advantages and disadvantages of the acyl [1(a)] and alkyl [1(b)] route are described below. Taken together these two routes provide a wider and better choice than either route alone. [It is believed that the alkyl intermediate $R_1Fe(CO)_4^-$ undergoes a migration of the alkyl group $R_1$ to form an acyl intermediate during reactions 2(a) and 2(b)].

The alkyl and acyl intermediates Ia and Ib need not and preferably are not separated or isolated from the reaction mixture. These intermediates, or some of them, are somewhat unstable such that isolation is difficult or results in low yields. Moreover, the conversion of the intermediates to the ester product proceeds in good yield without separation. Therefore, in the preferred practice of the invention the second step (converting Ia or Ib to an acid or amide) is carried out in the same reaction mixture.

From equations 2(a) and 2(b) above, it will be apparent that a cleaving agent is necessary. The function of the cleaving agent is to form an intermediate which, in the presence of water, forms an acid and in the presence of an amine or ammonia forms an amide. Where the cleaving agent is halogen, this intermediate is an acyl halide

(Z=halogen) which reacts with water to form the acid $R_1COOH$ or with ammonia or an amine to form amide

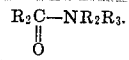

Where the cleaving agent is an oxygenating agent such as molecular oxygen or hypochlorite, etc., it is not clear what the intermediate is, but it is known that the oxidative product reacts with water to form the acid. Suitable cleaving agents are described below.

We have found that the best solvents are polar aprotic solvents. This class of solvents does not interfere with the reagents, reactants, intermediates or the end product unless the solvent contains a very active group, such as a highly active oxidizing group, which reacts destructively with a reagent, intermediate or end product. Also, yields are generally high and reaction rates are generally very fast. This class of solvents also affords other advantages. For example, if the "alkylating agent" $R_1X$ has a low reactivity (for example, if it is a primary chloride or a secondary bromide, chlorides being less reactive than bromides and secondary halides being less reactive than primary halides) a more active solvent such as HMPA or MP (see below for symbols) or mixtures of one of these with THF (a solvent of low activity) may be used to enhance activity and thereby improve yields and reaction rates. Further discussion of solvents appears below.

By "alkylating agent" is meant a compound $R_1X$ wherein X is a leaving atom or group and $R_1$ is attached to X by an aliphatic carbon atom. $R_1$ may be an aromatic group such as benzyl.

The above and other advantages will appear more fully from the description below. In the practice of the invention the following general precepts, procedures and choice of reagents, substrates, solvents, etc. are recommended.

REACTIVITY AND CHOICE of $R_1X$ $R_1$ may be any group having a primary of secondary aliphatic carbon atom attached to X provided $R_1$ is not of a nature and is not so substituted as to interfere with the reactions involved, especially the intermediates. Examples of $R_1$ are normal and branched chain alkyl (e.g., $C_1$ to $C_{20}$); substituted alkyl (e.g., $C_1$ to $C_{20}$), both normal and branched chain, having substituents such as a halogen which is less reactive than X, or hydroxyl, carboxy ester, ether, epoxy, etc.; unsaturated groups such as olefinic groups (preferably remote from X); phenyl and other aryl groups such as benzyl and phenylethyl, etc; cycloaliphatic groups such as cyclohexyl, cyclobutyl and cyclopentyl; etc.

X may be Cl, Br, I, tosylate, methanesulfonyl, trifluoromethane sulfonyl, phosphito such as o-phenylenephosphito or -phosphato

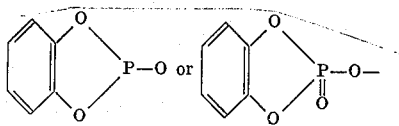

In general X may be any atom or group of atoms which is a suitable leaving group in alkylation reactions provided it is compatible with, e.g., is not highly reactive with the reagents reactants, solvents, intermediates and end products.

In order of activity in forming the acyl and alkyl intermediates, primary R's are more active than secondary R's. The order of activity of typical leaving groups is as follows: tosylate about equal to I > Br > Cl.

SOLVENTS AND THEIR CHOICE

The class of polar aprotic solvents may be used, and are preferred to protic solvents, provided they have no highly reactive groups which would react excessively with the reactants, intermediates, or end products. Examples are tetrahydrofuran (THF), hexamethylphosphoricamide (HMPA), N-methylpyrrolidone (MP), dimethylfuran (DMF), diglyme; lower ketones such as acetone and methyl ethyl ketone, dioxane, polyethers such as dimithoxy ether, cellosolve, lower aliphatic esters such as ethyl acetate and methyl acetate, diethyl carbonate, formic acid esters such as methyl and ethyl formates, lower nitriles such as acetonitrile and propionitrile, dimethyl sulfoxide, tetramethylene sulfone, pyridine, also crown ethers, etc. It will be understood that in the above wherever a $C_1$, $C_2$, or $C_3$ alkyl group is identified, higher homologues, e.g., $C_4$ to $C_6$ may be used. Solvent mixtures (e.g., THF/HMPA) may be used. Certain solvents which are not recommended by themselves, such as lower ethers, for example dimethyl ether and diethyl ether, may be used as co-solvents with the preferred solvent. Lower alcohols such as ethanol, methanol, the propanols and butanols may be used as solvents or co-solvents provided the competing ester-forming reaction, $R_1(CO)_nFe(CO)_4^- + ROH \longrightarrow R_1COOR$ is considerably slower than the acid or amide-forming reactions.

The conversion of the intermediate $R_1(CO)_nFe(CO)_4^-$ to an acid or amide requires a cleaving agent. If the acid is to be produced, the cleaving agent may be a halogenating agent or an oxygenating agent. Suitable halogenating agents are $Cl_2$, $Br_2$, $I_2$; mixed halogens such as BrI and BrCl; pseudohalogens such as cyanogen and $(SCN)_2$; other halogenating agents including halides of metals in a higher oxidation state, which are capable or reduction to a lower state of oxidation, such as stannic and ferric halides, e.g., $SnCl_4$, $SnBr_4$, $FeCl_3$, $FeBr_3$; and other agents that will halogenate aromatic rings. Suitable oxygenating agents are molecular oxygen, hypochlorites such as sodium hypochlorite, peroxides such as hydrogen peroxide, permanganates such as potassium permanganate, chromates and chromic oxide, chlorites and chlorates such as sodium and potassium chlorites and chlorates, etc.

If the amide is to be produced, any of the halogenating agents mentioned above may be the cleaving agent.

In the acid synthesis, the cleaving agent and water (the latter needed to convert the cleavage intermediates to the acid) may be added in any order, e.g., simultaneously, cleaving agent before the water or water before the cleaving agent. If halogen is used as the cleaving agent, it is preferred to add the water first and if an oxygenating agent is used as the cleaving agent, it is preferred to add the oxygenating agent first. In the amide synthesis it is preferred to add the amine or ammonia first, but it may be added with the cleaving agent or after the cleaving agent.

THE TETRACARBONYLFERRATE DIANION AND ITS COUNTER ION

As stated above, the tetracarbonylferrate dianion $Fe(CO)_4^{--}$ can be prepared by the reaction of iron pentacarbonyl and potassium hydroxide in alcohol, but the product is a mixture. We have found that the production of acids and amides is considerably improved by using pure tetracarbonylferrate dianion. By "pure" is meant commercially pure, e.g., about 95 to 99 percent purity. Pure reagent is preferably prepared as described in the aforesaid co-pending patent application. The procedure there described involves the reaction of an alkali metal (Na, K or Li) with iron pentacarbonyl in a suitable solvent such as THF. The preferred counter ion is sodium because it is the least expensive and works quite well. However, potassium and lithium may be used.

TEMPERATURE OF REACTION

The reactions involved will usually be carried out at about −15°C. to room temperature but moderately elevated temperatures may be employed to assist slow reactions if the increased temperature does not lead to unwanted side reactions or decomposition. Also, the reaction mixture may be heated after the reactions are completed to destroy unwanted components containing iron which are less stable than the desired end product. The lower limit of temperature is governed by reaction rates and the freezing points of solvents. Moderately reduced temperatures may be used if needed to stabilize an intermediate. Temperatures within the range of −15°C. to 50°C. have been used successfully.

THE CHOICE OF THE ACYL OR ALKYL ROUTE

Generally the alkyl route is preferred. It does not require the use of CO, workups are generally easier and yields are generally higher. If the reaction $R_1X + Fe(CO)_4^= \rightarrow R_1Fe(CO)_4^-$ is slow because of steric hindrance and if elimination from the group $R_1$ (e.g., elimination of HX from $R_1X$ to form an olefin) is not a problem the alkyl route proceeds well with an activating solvent such as HMPA. Thus neopentyl bromide is best used with the alkyl route for this reason. On the other hand, if there are two potential leaving groups as in X′—R—X where X′ and X are different halogens (e.g., Cl and Br or tosyl and Br or Cl) which differ substantially in activity, the more active solvents such as HMPA and MP will cause reaction at both sites (at X′ and X) if the alkyl route is employed. Better results are obtained with X′—R—X as the substrate if the acyl route is employed with a less active solvent such as THF. Also if competing elimination reactions such as elimination of hydrogen halide are a problem the acyl route with THF as the solvent is preferred because in THF, the elimination reaction is minimized and the alkyl intermediates tend to be unstable in the presence of THF if it is the only solvent.

A typical procedure for the preparation of sodium acyltetracarbonylferrates is described in Example 1; for the preparation of sodium alkyltetracarbonylferrates in Example 2, for the preparation of amides from either intermediate in Example 3 and for the preparation of acids from either intermediate in Example 4. Specific examples are set forth in Examples 5–8 and in Table I.

EXAMPLE 1

Procedure for the Preparation of Solutions of Sodium Acyltetracarbonylferrates

In an inert atmosphere chamber, $Na_2Fe(CO)_4$ (2.14g to 2.57 g, 10 mmol to 12 mmol) is weighed into a 250 ml round bottom flask, a magnetic stir bar added, the flask fitted with a rubber septum, and the flask removed from the chamber. Using needle stock, tetrahydrofuran (refluxed 2 hours over $CaH_2$ and then distilled from $CaH_2$ under nitrogen or distilled from $LiAlH_4$ under nitrogen) (100 ml) is added, the flask flushed with carbon monoxide, and then allowed to remain under 16 psi of carbon monoxide. An alkyl halide or tosylate (8 mmol to 10 mmol) is added to the reaction mixture using a gas-tight syringe. The reaction is stirred for 3 to 12 hours at 25°C.

EXAMPLE 2

Procedure for the Preparation of Solutions of Sodium Alkyltetracarbonylferrates

In an inert atmosphere chamber, 1.0 to 1.2 mmoles (214 to 257 mg) of $Na_2Fe(CO)_4$ is weighed into a 10 to 15 ml flask, a magnetic stirring bar added, the flask fitted with a rubber septum, and the flask removed from the chamber. By syringe or needle stock, 5 ml of tetrahydrofuran (refluxed 2 hours over $CaH_2$ and then distilled from $CaH_2$ under nitrogen, or distilled from $LiAlH_4$ under nitrogen) and one ml of hexamethylphosphorictriamide (refluxed for 4 hours at 0.1 mm over $CaH_2$, distilled, and then stored under nitrogen) is added and the mixture stirred until the $Na_2Fe(CO)_4$ dissolves. The solution is then fitted with a nitrogen bubbler, cooled to −15° and 1 mmol of the alkyl halide or tosylate added by syringe or needle stock. N-methyl-2-pyrrolidone (MP, refluxed 4 hours at 0.3 mm over $CaH_2$, distilled, and stored under nitrogen) may also be used as a solvent. With alkyl chlorides, which are less reactive than the bromide, iodide and tosylate, the reaction is carried out at a higher temperature such as 25°.

EXAMPLE 3

Procedure for the Preparation of Amides from Alkyl- or Acyltetracarbonylferrates A solution of 1.0 mmoles of the alkyl- or acyltetracarbonylferrate is cooled to −15° for THF or THF/HMPA solutions or to 0° for MP solutions, and 0.5 to 1.0 ml of the desired amide (dry and oxygen free) is added followed immediately by a solution of 2.54 g (10 mmoles) of iodine in 5 ml of THF (also at −15°). Carbon monoxide is rapidly evolved at this point. The reaction is stirred 30 minutes at the low temperature and then removed from the bath and allowed to warm to room temperature for 30 minutes to 12 hours (if sensitive groups are not present in the product, the longer time is preferable since iron by-products are slowly oxidized to water soluble compounds). After dilution of the reaction mixture with 50 ml of ether, a solution of 10 g of sodium thiosulfate or sodium bisulfite in 50 ml of water is added and the mixture stirred for 10 minutes. The ether layer is separated, washed two times with water, once with brine, stirred open to the air over sodium sulfate or magnesium sulfate until colorless or pale yellow, filtered, and then purified by distillation and/or chromatography.

EXAMPLE 4

Procedure for the Preparation of Acids from Acyl- or Alkyltetracarbonylferrates

To a solution of 10 mmoles of the acyl- or alkyltetracarbonylferrate is added one of the following:
1. $O_2$ bubbled into the reaction for 3 hours and stirred overnight with $H_2O$ (15 ml).
2. Aqueous NaClO(5¼ percent) added and stirred for 15 minutes.
3. $H_2O$ (10 ml) and then $I_2$ (12.7 g, 50 mmoles) added and allowed to stir for 2 hours.

The reactions were worked up differently depending on the particular method or solvent used.

For (1) and (2) concentrated HCl was added until a pH of 2 was attained. The reaction was warmed to 50°C and was stirred for 1 hour. Diethyl ether (100 ml) was added, the reaction was filtered, and the residue washed with $H_2O$ and diethyl ether. NaCl was added to the filtrate until it became saturated, and then the filtrate was extracted with diethyl ether (3 × 100 ml). If THF/HMPA or MP was used as the solvent, then the ether extractions were washed with 400 ml of $H_2O$. The extractions were dried over anhydrous $H_2SO_4$, filtered, and the ether removed using a rotoevaporator. The remaining residue was distilled under vacuum or recrystallized from acetone/$H_2O$ for the final product.

For (3) sodium metabisulfite is added until the brown color changes to a light clear yellow solution. 100 ml of saturated NaCl solution are added and then extracted with diethyl ether (3 × 100 ml). The extractions are combined, washed with 200 ml H₂O, dried over anhydrous Na₂SO₄, and filtered. The solvent is removed using a rotoevaporator and the crude residue is distilled or recrystallized.

EXAMPLE 5

Preparation of N,N-diethylhexanamide via hexanoyltetracarbonylferrate ($R_1$ = n-hexyl, $R_3$ and $R_4$ = ethyl; acyl route 1a)

A flask containing 257 mg (1.2 mmoles) of $Na_2Fe(CO)_4$ in 5 ml of THF was purged with CO, 122 µl (1.0 mmole) of amyl bromide added, and the system placed under 10 psi of CO. After stirring for 3 hours at 25° the reaction was cooled to −15° and 1 ml of diethylamine (stored over KOH and degassed) was added; this was followed immediately by 1.27 g (5 mmoles) of iodine in 5 ml of THF (also cooled to −15°). After stirring at −15° to 5° for 1 hour, and 30 minutes at 25°, glc analysis (using 100 µl tridecane as an internal standard) showed 80 percent of N,N-diethylhexamide. The reaction was then diluted with ether (70ml) and poured into a solution of 10g of sodium thiosulfate in 100 ml of water. After stirring 5 minutes the mixture was filtered through Celite, and the aqueous layer made basic (pH9) with KOH and saturated with NaCl. The aqueous layer was then separated and extracted with ether. The combined ether layers were washed with brine, dried over sodium sulfate, and the solvent removed on a steam bath. Glc analysis showed 72 percent of N,N-diethylhexanamide.

EXAMPLE 6

Preparation of Tridecanoic Acid from 1-bromododecane ($R_1$ = n-dodecyl; alkyl route 1b)

This was set up initially as in Example 1, 6 ml HMPA and 60 ml THF were added as a solvent for $Na_2Fe(CO)_4$ (1.25 g, 8.85 mmoles). 1-Bromododecane (1.22 g, 4.9 mmol) was added using a gas-tight syringe. After 1½ hours of stirring all the bromide had reacted (checked by glpc). An aqueous solution of NaClO (5¼%, clorox) (20 ml) was added at 0°C. The reaction turned black. 300 ml of n-hexane were added and the reaction solution was washed with aqueous 10% NaHCO₃ (3 × 200 ml). Concentrated HCl was added to the aqueous extractions until pH~2 was reached, then the solution was extracted with $CH_2Cl_2$ (3 × 100 ml). The combined $CH_2Cl_2$ extractions were dried over anhydrous Na₂SO₄, filtered, and rotovaped to remove the $CH_2Cl_2$. Recrystallization from H₂O yielded 0.34 g (32.4 percent) of tridecanoic acid.

EXAMPLE 7

Preparation of Tridecanoic Acid from 1-chlorododecane ($R_1$ = n-dodecyl; alkyl route 1b)

In an inert atmosphere chamber, $Na_2Fe(CO)_4$ (1.29 g, 6.0 mmoles) was weighed into a 100 ml round bottom flask. MP (30 ml) which had been previously dried over CaH₂ and distilled under N₂ and a magnetic stir bar were added, and the flask fitted with a rubber septum. The flask was then removed from the chamber and 1-chlorododecane (1.04 g, 5.08 mmol) was added using a gas-tight syringe. After 10 minutes of stirring all of the starting chloride had reacted (checked by glpc). O₂ was added to the reaction and 5 ml of diethyl ether were added to reduce the viscosity of the solution. After 3 hours KOH (5 g) and H₂) (20 ml) were added and the reaction allowed to stir. Concentrated HCl was added slowly until the solution became clear yellow. H₂O (300 ml) was added and the mixture extracted with diethyl ether (3 × 100 ml). The ether extractions were combined and washed with 200 ml of saturated NaCl solution. An aqueous solution of 50 % KOH was added with stirring until the pH of the ether remained 12. The ether layer was extracted with H₂O (3 × 100 ml). Concentrated HCl was added to the water extractions until pH~2 and then the solution was extracted with diethyl ether (3 × 100 ml). The ether extractions were dried over anhydrous Na₂SO₄ for 3 hours, filtered, and rotovaped to remove all the ether. Recrystallization 2x from acetone/H₂O yielded 920 mg (84%) of tridecanoic acid.

EXAMPLE 8

Preparation of 7-chloroheptanoic acid from 1-bromo-6-chlorohexane [$R_1$ = Cl(CH₂)₆-; acyl route 1a]

In an inert atmosphere chamber, $Na_2Fe(CO)_4$ (2.14 g, 10.0 mmoles) was weighed into a 250 ml single necked round bottom flask. A magnetic stir bar was added and the flask was fitted with a rubber septum and removed from the chamber. Using needle stock, THF (60 ml) which was previously dried over CaH₂, distilled, and degassed was added to the flask. The flask was pressured to 15 psi of CO and 1-bromo-6-chlorohexane (1.01 g, 5.05 mmoles) was added using a gas-tight syringe. After stirring for 1 hour O₂ was bubbled into the reaction, whereupon the reaction turned from orange to dark brown. After 30 minutes H₂O (10 ml) was added and O₂ addition continued. After 1 hour 100 ml H₂O and 70 ml of diethyl ether were added. After another hour of stirring, the reaction was heated to 50°C and stirred for 7 hours. Concentrated HCl (10 mmoles) was added and the reaction filtered. More HCl was added to the filtrate until pH~2 was reached. An additional 100 ml of diethyl ether was added and the mixture extracted with diethyl ether (3 × 100 ml). The combined ether extractions were dried over anhydrous Na₂SO₄, filtered, and rotovaped to remove the ether. Distillation using a bulb-to-bulb apparatus yielded 0.765 g (92.3%); b.p. 120°–140°C/500µ. This was slightly contaminated with the 7-chloroheptanal but upon redistillation yielded 693 mg (83.6%) of 7-chloroheptanoic acid.

TABLE I

| EXAMPLE NO. | ROUTE | $R_1X$ | CLEAVING AGENT | $R_2R_3NH$ | SOLVENT | PRODUCT |
|---|---|---|---|---|---|---|
| 9 | alkyl | $n\text{-}C_8H_{17}Cl$ | $I_2$ | $(C_2H_5)_2NH$ | THF/HMPA | $n\text{-}C_8H_{17}CON(C_2H_5)_2$ |
| 10 | do. | $n\text{-}C_8H_{17}Br$ | $I_2$ | do. | do. | do. |
| 11 | acyl | do. | $I_2$ | do. | THF | do. |
| 12 | acyl | n-hexylbromide | $O_2$ | — | do. | n-heptanoic acid |
| 13 | do. | 1-bromo-3-phenyl propane | $O_2$ | — | do. | 4-phenylbutanoic acid |
| 14 | alkyl | do. | $O_2$ | — | THF/HMPA | do. |
| 15 | acyl | 1-bromo-2-phenyl ethane | $O_2$ | — | THF | hydrocinnamic acid |
| 16 | do. | n-amyl bromide | $O_2$ | — | do. | hexanoic acid |
| 17 | do. | n-octyl bromide | $O_2$ | — | do. | nonanoic acid |
| 18 | alkyl | n-dodecyl bromide | $O_2/-15°C$ | — | do. | tridecanoic acid |
| 19 | do. | do. | NaClO | — | THF/HMPA | do. |
| 20 | acyl | do. | do. | — | THF | do. |
| 21 | alkyl | do. | $I_2/H_2O$ | — | MP | do. |
| 22 | alkyl | n-dodecyl chloride | $O_2/H_2O$ | — | THF/HMPA | Tridecanoic acid |
| 23 | do. | do. | do. | — | MP | do. |
| 24 | acyl | $Cl(CH_2)_6OTs$ | $O_2/H_2O$ | — | THF | 6-chloroheptanoic acid |
| 25 | do. | $Cl(CH_2)_6Br$ | do. | — | do. | do. |
| 26 | alkyl | $Cl(CH_2)_6OH$ | do. | — | THF/HMPA | 7-hydroxyheptanoic acid |
| 27 | do. | do. | do. | — | MP | do. |
| 28 | acyl | n-amyl 6-bromo hexanoate | do. | — | THF | monoamyl ester of heptanedioic acid |
| 29 | do. | cyclopentyl tosylate | do. | — | THF | cyclopentyl carboxylic acid |
| 30 | alkyl | n-amylbromide | $I_2/H_2O$ | — | do. | hexanoic acid |
| 31 | do. | do. | do. | — | MP | do. |

We claim:

1. A method of producing acids $R_1COOH$ which comprises reacting a tetracarbonyl ferrate dianion with the substrate $R_1X$ to produce an intermediate $R_1(CO)n Fe(CO)_4^-$, and reacting said intermediate with a cleaving agent and water, said cleaving agent being a halogenating agent or an oxygenating agent, to form said acids, wherein $R_1$ is selected from the group consisting of normal and branched chain alkyl, normal and branched chain alkyl substituted by halide, hydroxyl, carboxy ester, ether or epoxy, an olefinic group, an aryl group and a cycloaliphatic group; X is selected from the group consisting of halide, tosylate, methane sulfonyl, trifluoromethane sulfonyl, phosphito, or phosphato; and n is zero or unity.

2. The method of claim 1 wherein the reaction is carried out in a polar aprotic solvent.

3. The method of claim 2 wherein the solvent is selected from the group consisting of THF, HMPA, MP and mixtures thereof with one another and mixtures thereof with other solvents.

4. The method of claim 2 wherein n is zero.

5. The method of claim 2 wherein n is unity.

6. The method of claim 2 wherein $R_1$ is a primary group.

7. The method of claim 2 wherein $R_1$ is a secondary group.

8. The method of claim 1 wherein the reaction is carried out in a polar aprotic solvent.

9. The method of claim 1 wherein the cleaving agent is a halogenating agent.

10. The method of claim 1 wherein the cleaving agent is an oxygenating agent.

11. The method of claim 1 wherein the carbon atom of $R_1$ attached to the carboxyl group is a chiral carbon atom and its group is in optically active form.

12. The method of claim 1 wherein the cleaving agent is oxygen.

13. A method of synthesizing 6-chloroheptanoic acid, $Cl(CH_2)_6COOH$, which comprises the following steps:

a. reacting 6-chlorohexyl bromide, $Cl(CH_2)_6Br$, with the tetracarbonylferrate anion, $Fe(CO)_4^=$ in tetrahydrofuran and in the presence of carbon monoxide to produce the intermediate $Cl(CH_2)_6(CO)Fe(CO)_4^-$ in accordance with the reaction $Cl(CH_2)_6Br + Fe(CO)_4^= \xrightarrow{CO} Cl(CH_3)_6(CO)FeCO_4^- + Br^-$ b. and then cleaving said intermediate with molecular oxygen and reacting the cleavage product with water in accordance with the reaction

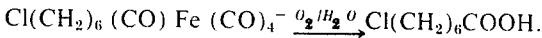

$Cl(CH_2)_6(CO)Fe(CO)_4^- \xrightarrow{O_2/H_2O} Cl(CH_2)_6COOH.$

* * * * *